US012112242B2

(12) United States Patent
Kang et al.

(10) Patent No.: US 12,112,242 B2
(45) Date of Patent: Oct. 8, 2024

(54) MACHINE LEARNING ACCELERATOR WITH DECISION TREE INTERCONNECTS

(71) Applicant: International Business Machines Corporation, Armonk, NY (US)

(72) Inventors: Mingu Kang, Old Tappan, NJ (US); Seonghoon Woo, New York, NY (US); Eun Kyung Lee, Bedford Corners, NY (US); Sukjay Chey, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 16/986,506

(22) Filed: Aug. 6, 2020

(65) Prior Publication Data
US 2022/0044145 A1 Feb. 10, 2022

(51) Int. Cl.
*G06N 20/00* (2019.01)
*G06N 5/01* (2023.01)

(52) U.S. Cl.
CPC ............... *G06N 20/00* (2019.01); *G06N 5/01* (2023.01)

(58) Field of Classification Search
CPC .................................. G06N 20/00; G06N 5/01
See application file for complete search history.

(56) References Cited

U.S. PATENT DOCUMENTS

| 5,574,673 | A | * | 11/1996 | Lowy | ...................... | G06F 7/584 |
| | | | | | | 708/250 |
| 2020/0125097 | A1 | * | 4/2020 | Juliato | ................. | G06F 16/9027 |
| 2021/0349838 | A1 | * | 11/2021 | Van Benthem | ....... | G06F 13/364 |

OTHER PUBLICATIONS

Mingu Kang, A 19.4-nJ/Decision, 364-K Decisions/s, In-Memory Random Forest Multi-Class Inference Accelerator, May 2, 2018 (Year: 2018).*
Mingu Kang, A 19.4 nJ/decision 364K decisions/s In-memory Random Forest Classifier in 6T SRAM Array, Nov. 7, 2017 (Year: 2017).*
Chuan Cheng, "Random Forest Training on Reconfigurable Hardware," Imperial College London, Department of Electrical and Electronic Engineering, Jul. 2015, 112 pages.
Lei Zhao et al., "RFAcc: A 3D ReRAM Associative Array Based Random Forest Accelerator," Proceedings of the ACM International Conference on Supercomputing (ICS), Jun. 2019, pp. 473-483.
Leo Breiman, "Random Forests," Machine Learning, Oct. 2001, pp. 5-32, vol. 45.
Brian Van Essen et al., "Accelerating a Random Forest Classifier: Multi-Core, GP-GPU, or FPGA?," IEEE 20th International Symposium on Field-Programmable Custom Computing Machines (FCCM), Apr.-May 2012, pp. 232-239.

* cited by examiner

*Primary Examiner* — Abdullah Al Kawsar
*Assistant Examiner* — Tewodros E Mengistu
(74) *Attorney, Agent, or Firm* — Erik Johnson; Ryan, Mason & Lewis, LLP (57) ABSTRACT

Techniques for performing improved machine learning using decision trees are disclosed. In one example, a system includes a plurality of decision tree structures, and configuration logic operatively coupled to the plurality of decision tree structures. The configuration logic selectively configures the plurality of decision tree structures to form at least one of: one or more combined decision tree structures, wherein a combined decision tree structure comprises multiple interconnected ones of the plurality of decision tree structures; and one or more individual decision tree structures, wherein an individual decision tree structure comprises a single one of the plurality of decision tree structures.

25 Claims, 9 Drawing Sheets

MACHINE LEARNING ACCELERATOR WITH DECISION TREE INTERCONNECTS

BACKGROUND

Machine learning algorithms, considered examples of artificial intelligence systems, are becoming widely used in computational applications that benefit by improved iterative computation accuracy. A random forest algorithm is one of the most widely used machine learning algorithms other than neural network algorithms. Random forests represent an ensemble learning approach that constructs a plurality of decision trees during training and outputs, by way of example, a classification result determined from results of individual decision trees in order to obtain an accurate prediction result based on a given input.

SUMMARY

Embodiments of the invention provide improved techniques for performing machine learning using decision trees.

In one illustrative embodiment, a system comprises a plurality of decision tree structures, and configuration logic operatively coupled to the plurality of decision tree structures. The configuration logic selectively configures the plurality of decision tree structures to form at least one of: one or more combined decision tree structures, where a combined decision tree structure comprises multiple interconnected ones of the plurality of decision tree structures; and one or more individual decision tree structures, where an individual decision tree structure comprises a single one of the plurality of decision tree structures.

Each one of the plurality of decision tree structures may, for example, be balanced in shape. By way of further example, each one of the plurality of decision tree structures may be uniform in shape with respect to each other ones of the plurality of decision tree structures.

Further illustrative embodiments are respectively provided in forms of an apparatus with a processor and a memory configured to execute instruction code, a method configured to perform at least the selective configuring step, and a non-transitory processor-readable storage medium having embodied therein executable instruction code that when executed by a processor causes the processor to perform at least the above step.

Advantageously, by way of one example only, in a hardware-based implementation, hardware overhead is reduced by providing more efficient utilization of the hardware that implements the plurality of decision tree structures.

These and other features and advantages of embodiments described herein will become more apparent from the accompanying drawings and the following detailed description.

DETAILED DESCRIPTION

Illustrative embodiments may be described herein with reference to exemplary computing environments, cloud infrastructure, data repositories, data centers, data processing systems, information processing systems, computer systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud platform," "cloud computing environment," "cloud infrastructure," "data repository," "data center," "data processing system," "information processing system," "computer system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, the random forest algorithm is one of the most widely used machine learning algorithms given its high classification accuracy with relatively simple computing overhead (comparative to other machine learning algorithms). For these reasons, random forest algorithms can advantageously be executed in edge/mobile computing platforms under tight resource constraints.

Figure 1:
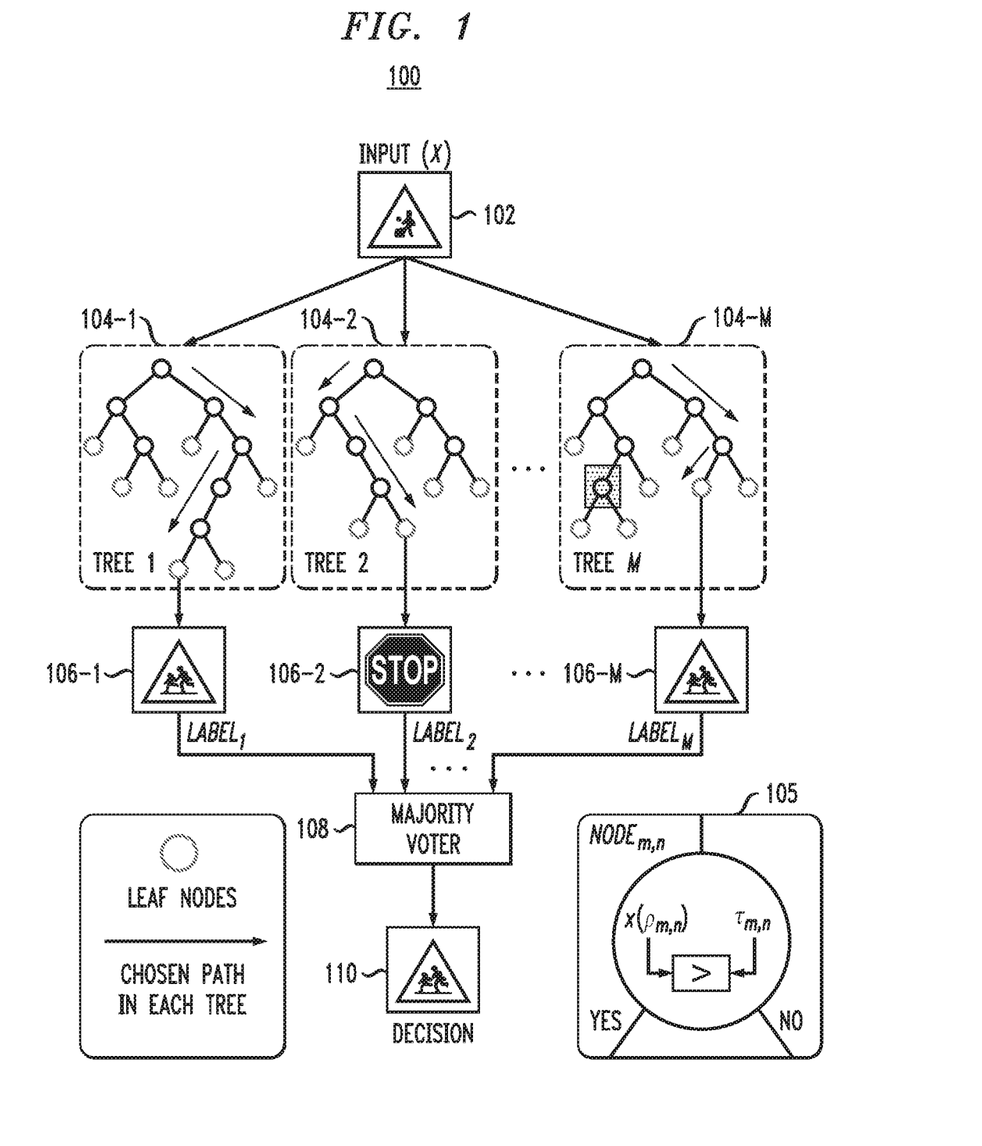
FIG. 1 depicts an example of a random forest algorithm with which one or more illustrative embodiments can be implemented.

FIG. 1 depicts an example of a random forest algorithm 100 with which one or more illustrative embodiments can be implemented. As shown, a data input 102 (e.g., image) is presented to a plurality of decision trees 104-1, 104-2, . . . , 104-M (tree 1, tree 2, . . . , tree M), collectively or individually referenced as 104. The plurality of decision trees 104-1, 104-2, . . . , 104-M generate classification results, i.e., a plurality of classification results 106-1, 106-2, . . . , 106-M (label$_1$, label$_2$, . . . , label$_M$), respectively. Each decision tree 104 has multiple nodes denoted as circles connected by edges, wherein the lighter grey outlined nodes are leaf nodes and darker grey outlined nodes are internal nodes, and the arrows denote the chosen decision path through the decision tree. Each leaf node has a class label determined by comparison results of tree nodes with training examples reaching that leaf. Each internal node is a question on some feature and branches out according to the answer to the question.

For example, as depicted by block 105, an internal node in a given decision tree 104 compares the specific (p-th) input pixel (from data input 102) versus a threshold, e.g., in the m-th tree's n-th node, compares p-th pixel of input X and threshold τ, and generates a "yes" or "no" result ("yes" the pixel is greater than the threshold or "no" the pixel is not greater than the threshold). The threshold and pixel location (p) are obtained during training of the decision tree. Then, a leaf node in each tree 104 generates a classification result which is provided to a majority voter module 108. Majority voter module 108 generates an output decision 110, which is the decision result reached by the majority of the leaf nodes to which module 108 is connected. Thus, while each decision tree is not necessarily accurate in predicting the input by itself, the ensemble of decision trees is more accurate than any individual decision tree that constitutes the ensemble.

One challenge, however, with existing random forest algorithms is the irregular shape of decision trees used to generate an output decision. For example, when comparing decision trees 104-1, 104-2 and 104-M, it is to be noted that they each have a different shape in terms of nodes and edges. The shape of a decision tree is determined during training, leading to highly irregular shapes. For example, when comparing the left side of decision tree 104-1 against the left bottom side of decision tree 104-M, note that decision tree 104-1 is missing the two lower nodes that decision tree 104-M has. As a result, decision trees 104-1 and 104-M also have different depths. Likewise, decision tree 104-2 is different in shape than decision trees 104-1 and 104-M. This irregularity causes many challenges in very-large-scale integration (VLSI) hardware implementations.

Figure 2:
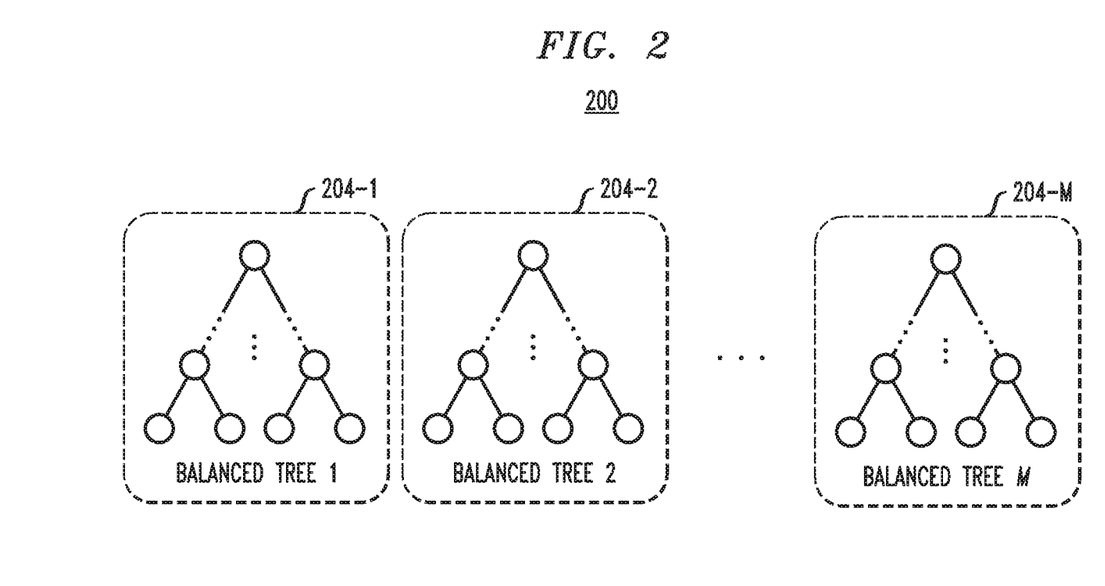
FIG. 2 depicts a balanced decision tree technique in a random forest algorithm according to an illustrative embodiment.

It is realized herein that to address the above-mentioned shape irregularity issue, as well as other drawbacks in existing random forest algorithms, decision trees in a random forest system should be balanced and uniform in shape (e.g., number of nodes, number of edges, depth, etc.) as illustrated in FIG. 2 wherein a plurality of decision trees 200 comprising decision trees 204-1, 204-2, . . . , 204-M have a balanced (and uniform) shape, i.e., balanced tree 1, balanced tree 2, . . . , balanced tree M. By the term "balanced" it is illustratively meant that there are an equal number of nodes in each decision path of the decision tree, and by the term "uniform" it is illustratively meant that each decision tree has the same shape as the other decision trees used in the random forest system.

Given that decision trees will have missing nodes due to irregular shapes following training, illustrative embodiments prepare full (balanced and uniform) shaped trees (as shown in FIG. 2) for hardware implementations as it is not known which type of tree shape will be mapped to a hardware implementation in a variety of applications. Accordingly, when mapping the trained tree shape on to a hardware implementation, multiple nodes may be used as filler nodes, such that the left and right branches of the decision tree are uniform in the number of nodes and edges, and thus also uniform in terms of depth.

Further regarding the depth difference issue of decision trees formed during training, it is realized herein that while the depth of each tree can be made uniformly deep, it is difficult to anticipate how much depth will be used for each application. This raises additional challenges:
(i) the node number increases exponentially with the depth (D) of a tree, e.g., $2^D-1$;
(ii) thus given (i), employing trees with large enough depth causes significant hardware overhead;
(iii) decision tree hardware with large depth causes more filler nodes, which reduces hardware utility; and
(iv) if hardware for trees is prepared with shorter depth, and thus depth is limited during training, the maximum achievable accuracy is significantly limited.

It is realized herein that the depth issue can be overcome by providing a decision tree hardware unit with a relatively large depth, wherein depth is measured by the number of node levels in a vertical direction. For example, it is realized that a depth of six covers most trees (e.g., 80%) in a typical random forest algorithm. However, as depicted in example 300 in FIG. 3, a single decision tree 304 with depth equal to six cannot be supported by typical hardware units. Note that decision tree 304 includes node 1 at node depth level 1, nodes 2 and 3 at node depth level 2, nodes 4, 5 and 6 at node depth level 3, nodes 7 and 8 at node depth level 4, nodes 9, 10 and 11 at node depth level 5, and nodes 12 and 13 at node depth level 6.

Figure 3:
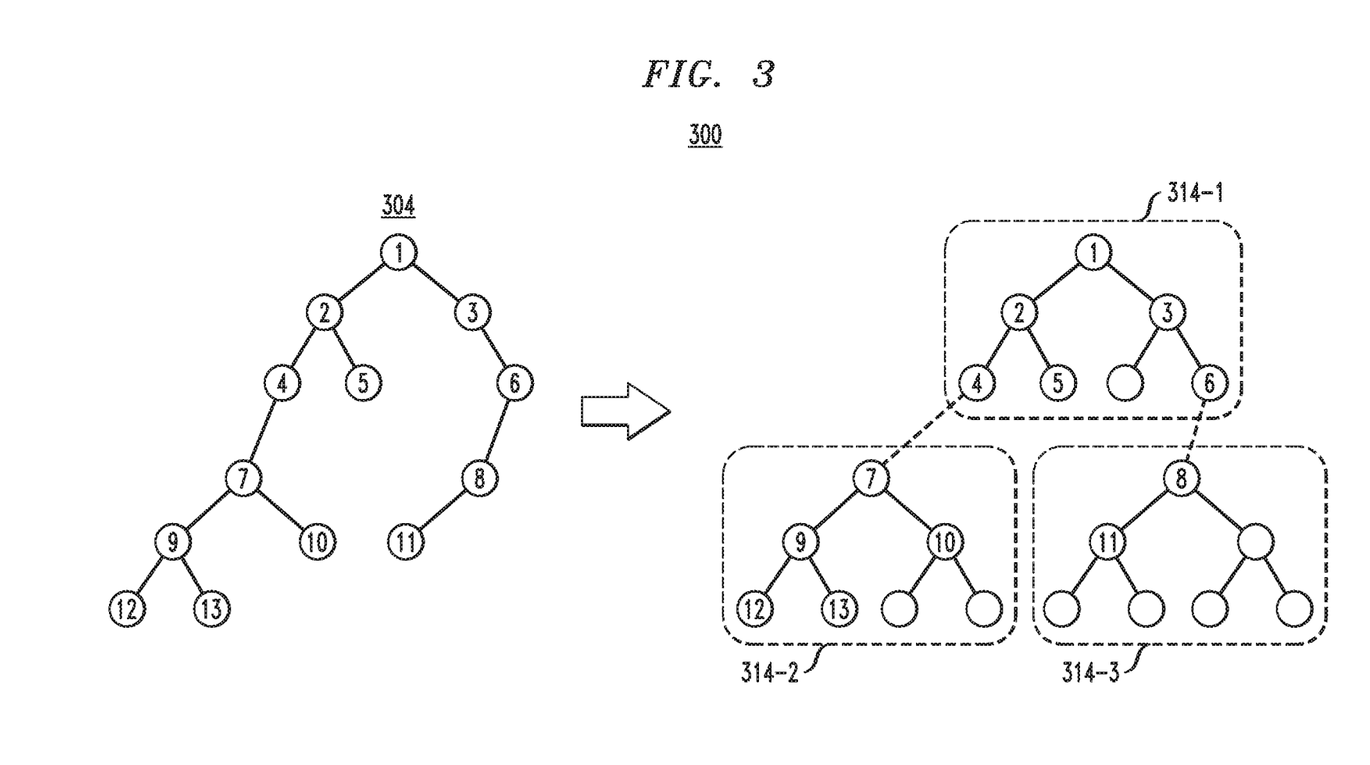
FIG. 3 depicts a decision tree interconnection technique in a random forest algorithm according to an illustrative embodiment.

In accordance with illustrative embodiments, decision tree 304 with a depth of six can be achieved by configuring a set of interconnected decision trees 314-1, 314-2 and 314-3 as shown on the right side of FIG. 3. More particularly, decision trees 314-1, 314-2 and 314-3 each individually have a depth of three but are interconnected to create the same tree structure as decision tree 304. Note that solid lines represent hard-wired interconnects and generally provide faster processing and lower energy consumption than re-configurable interconnects represented as dashed lines. Accordingly, to replicate decision tree 304, decision tree 314-1 includes nodes 1, 2, 3, 4, 5 and 6 interconnected in the same manner as nodes 1, 2, 3, 4, 5 and 6 in decision tree 304, decision tree 314-2 includes nodes 7, 9, 10, 12 and 13 interconnected in the same manner as nodes 7, 9, 10, 12 and 13 in decision tree 304, and decision tree 314-3 includes nodes 8 and 11 interconnected in the same manner as nodes 8 and 11 in decision tree 304. Note that any nodes not numbered in decision trees 314-1, 314-2 and 314-3 are filler nodes used to maintain balanced (and uniform) tree structures as mentioned above.

Thus, advantageously, a random forest system can be constructed in accordance with illustrative embodiments, by creating a plurality of balanced trees and using re-configurable interconnects to construct a larger (e.g., more nodes and larger depth) decision tree from multiple smaller balanced decision trees. Such smaller balanced decision trees may also be referred to herein as "sub-trees" since two or more of such decision trees are combinable to form a larger decision tree as explained above with respect to example 300 in FIG. 3.

Figure 4:
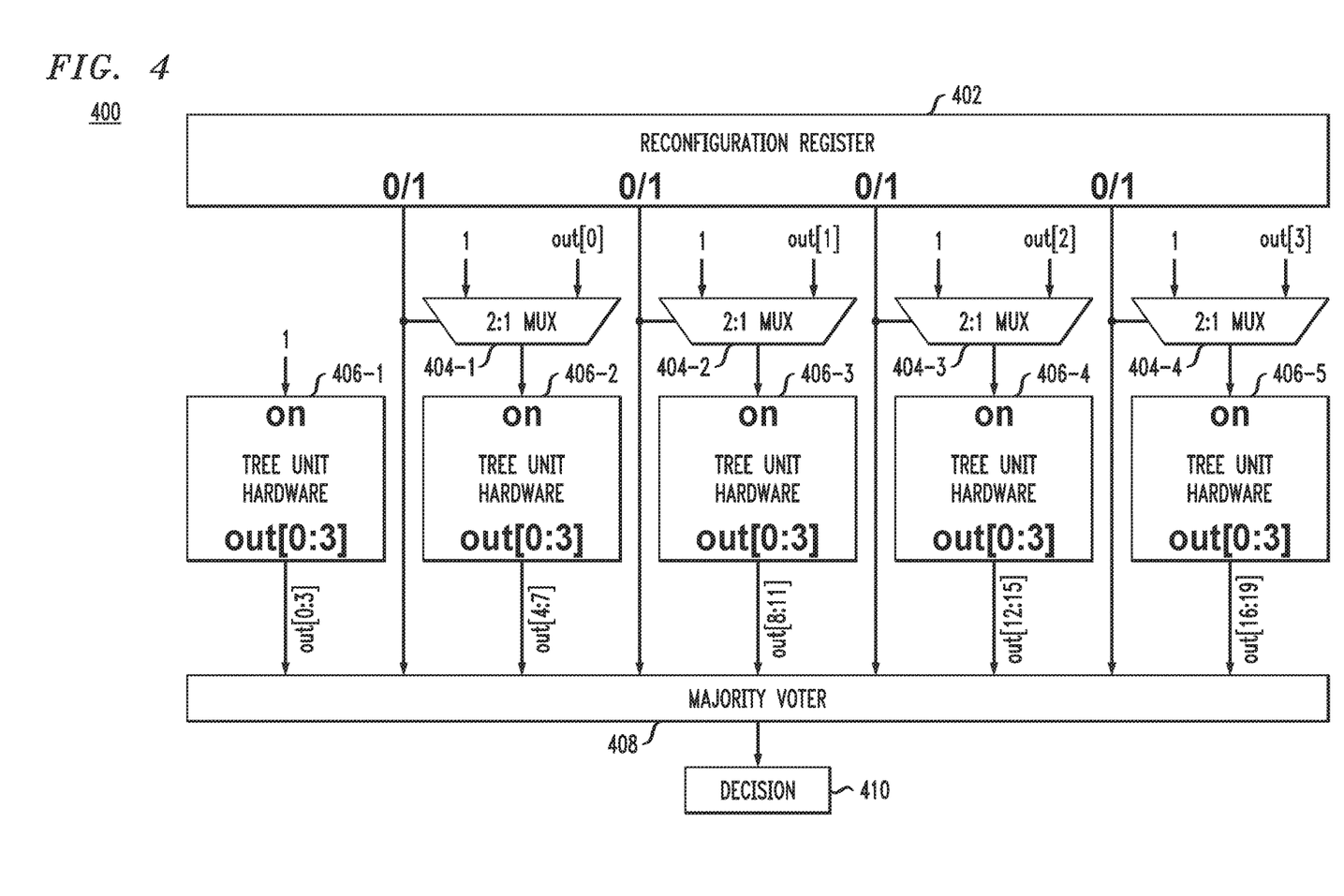
FIG. 4 depicts a hardware implementation of a decision tree interconnection technique in a random forest algorithm system according to an illustrative embodiment.

Turning now to FIG. 4, a hardware implementation is depicted of a decision tree interconnection technique in a random forest algorithm system 400 according to an illustrative embodiment. System 400 can also be referred to as a random forest accelerator or, more generally, a machine learning accelerator. As shown, random forest algorithm system 400 comprises logic for enabling the above functionality of combining two or more decision trees to form a larger decision tree (e.g., as illustrated in FIG. 3). In this illustrative embodiment, system logic comprises a reconfiguration register 402, a set of 2:1 multiplexers 404-1, 404-2, 404-3 and 404-4 (which may be collectively or individually referenced herein as 404), a set of decision tree unit hardware modules 406-1, 406-2, 406-3, 406-4 and 406-5 (which may be collectively or individually referenced herein as 406), and a majority voter module 408. It is to be appreciated that the numbers of multiplexers 404 and decision tree unit hardware modules 406 shown in FIG. 4 are for illustrative purposes and, thus, alternative embodiments can have different numbers of such logic components. Also, reference to data inputs, data outputs, selection bits, control bits, etc. as being input and/or output from a given logic components assumes that the given logic component has corresponding terminals that enable connectivity with other logic components to receive such inputs and/or send such outputs.

Regarding the reconfiguration register 402, as shown in this example, four control bits are output that are operatively connected to a selection input of each 2:1 multiplexer 404. Setting of the control bits (more generally, control data) in the reconfiguration register 402 can be done by an administrator, another system, or some combination thereof. The control bits can be prestored in register 402 or otherwise determined and set in real-time when the random forest algorithm is to be executed. The control bits, as will be further explained, determine whether each decision tree unit hardware module 406 functions as an independent tree (i.e., functionally separate from other decision trees) or a sub-tree as a part of larger decision tree. For example, in one illustrative embodiment, a logic 0 for the control bit causes a decision tree unit hardware module 406 to operate as an independent decision tree (thus, five separate decision trees in the case of the FIG. 4 embodiment). A logic 1 for the control bit causes a decision tree unit hardware module 406 to operate as a sub-tree of a larger decision tree (thus, the five separate decision trees are interconnected to form a large decision tree in the case of the FIG. 4 embodiment). Assuming each sub-tree has a depth D, then a large tree of depth 2D is formed when the five sub-trees are combined. Thus, outputs from decision tree unit hardware module 406-1 are respectively connected via multiplexers 404-1 through 404-4 to decision tree unit hardware modules 406-2 through 406-5 (when selected by the appropriate control bits from reconfiguration register 402). Note that when depth D is three, as illustratively assumed in the FIG. 4 embodiment, there are four outputs, i.e., out[0:3], from decision tree unit hardware module 406-1 (e.g., see balanced sub-tree example in FIG. 3) which are respectively connected (selectively via a corresponding multiplexer 404) as inputs to the other decision tree unit hardware modules 406-2 through 406-5 as shown. Then, since each of decision tree unit hardware modules 406-2 through 406-5 themselves have a depth D of three, each one also generates four outputs, i.e., 406-2 (out[4:7]), 406-3 (out[8:11]), 406-4 (out[12:15]), and 406-5 (out[16:19]).

It is to be appreciated that less than all five of the decision tree unit hardware modules 406 can be combined to form a larger decision tree (e.g., recall the example in FIG. 3 with three sub-trees being combined). Note also that each decision tree unit hardware module 406 is configured as a decision tree that is balanced (and uniform) in shape with respect to the other decision tree unit hardware modules 406.

More particularly, in operation, the control bits from reconfiguration register 402 respectively control the selection input of the 2:1 multiplexers 404, i.e., one of the logic values 0/1 causes one of the two data inputs of the multiplexer to be connected to the data output of the multiplexer while the other of the logic values 0/1 causes the other of the two data inputs of the multiplexer to be connected to the data output of the multiplexer. Thus, in the illustrative embodiment of FIG. 4, when a control bit of reconfiguration register 402 is a logic 1, then a corresponding data output of decision tree unit hardware module 406-1 (which is operatively connected to one of the two data inputs of one of the 2:1 multiplexers 404 as shown) is selected as the input of one of the other decision tree unit hardware modules 406-2 through 406-5) thus selectively interconnecting the two decision tree unit hardware modules. When a control bit of reconfiguration register 402 is a logic 0, then an independent data input (e.g., shown in FIG. 4 as a logic 1 just by way of example) is selected as the input of the corresponding decision tree unit hardware module 406.

Other logical combinations are supported by alternative embodiments. For example, a combination of the four control bits of reconfiguration register 402 set to logic values 1100 will generate one combined decision tree (i.e., a decision tree comprising interconnected decision tree unit hardware modules 406-1, 406-2 and 406-3) plus two smaller independent decision trees (i.e., one decision tree comprising single decision tree unit hardware module 406-4 and another decision tree comprising single decision tree unit hardware module 406-5).

Note that each decision tree unit hardware module 406 comprises a set of nodes and edges wherein a node can be configured as a leaf node or an internal node. Thus, any given node can be configured to compare an input data unit versus a threshold, e.g., recall as one example that in the explanation of FIG. 1 above, in the m-th tree's n-th node, p-th pixel of input X and threshold τ are compared to generate a "yes" or "no" result. An exemplary hardware implementation of a decision tree unit hardware module will be explained in further detail below in the context of FIG. 5.

Majority voter module 408 receives the outputs of each decision tree unit hardware module 406, as well as the control bits from reconfiguration register 402, and generates an output decision 410 therefrom. Note that majority voter module 408 determines which nodes in each decision tree unit hardware module 406 are leaf nodes based on the reconfiguration register control bits. That is, from the value of the control bit, majority voter module 408 knows whether the decision tree that provided the given output is functioning as a sub-tree of a larger decision tree (e.g., control bit being a logic 1) or as a single independent decision tree (e.g., control bit being a logic 0). Recall that a leaf node typically provides a candidate classification label to the majority voter module 408, which then makes output decision 410 based on the candidate classification labels it receives from the various leaf nodes. For example, in a simple majority approach, majority voter module 408 selects as part of the output decision 410, the candidate classification label provided by more than 50% of a given set of leaf nodes.

Figure 5:
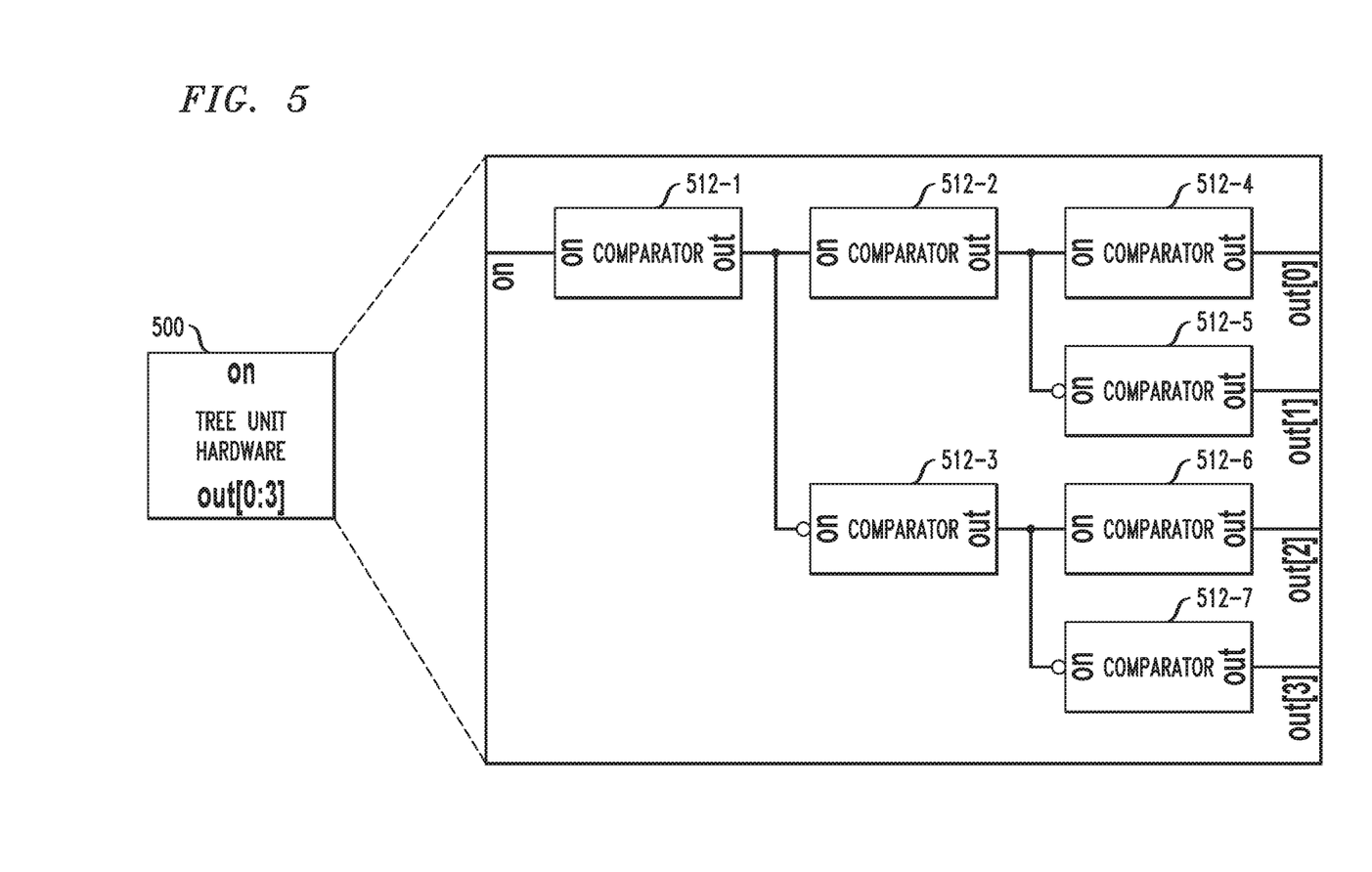
FIG. 5 depicts a hardware implementation of a decision tree module in a random forest algorithm system according to another illustrative embodiment.

FIG. 5 depicts a hardware implementation of a decision tree unit hardware module 500 in a random forest algorithm system according to another illustrative embodiment. It is to be appreciated that decision tree unit hardware module 500 is one embodiment of a decision tree unit hardware module 406 shown in FIG. 4. While the FIG. 5 embodiment uses out[0:3] nomenclature from decision tree unit hardware module 406-1, it is to be appreciated that each one of decision tree unit hardware modules 406-2 through 406-5 can be implemented the same as decision tree unit hardware module 500.

As shown, decision tree unit hardware module 500 comprises a set of comparators 512-1, 512-2, 512-3, 512-4, 512-5, 512-6 and 512-7 configured in a tree structure hierarchical configuration. More particularly, consistent with the decision trees described above, each comparator may be considered a node with connections between the comparators being edges, and a node compares an input data unit to a threshold value and outputs a result based on the comparison. As shown, the input of comparator 512-1 is the input to the decision tree unit hardware module 500 and the output of comparator 512-1 is the input of comparator 512-2 while the inverse of the output of comparator 512-1 is the input of comparator 512-3. The output of comparator 512-2 is the input of comparator 512-4 while the inverse of the output of comparator 512-2 is the input of comparator 512-5. The output of comparator 512-3 is the input of comparator 512-6 while the inverse of the output of comparator 512-3 is the input of comparator 512-7. Note that the outputs of comparators 512-4, 512-5, 512-6 and 512-7, i.e., out[0], out[1], out[2] and out[3], can serve as inputs to respective other decision tree unit hardware modules when interconnected to form a larger decision tree as shown in FIG. 4 and more generally described herein. Note again that the set of comparators in FIG. 5 are configured to similarly generate the other sets of outputs shown in system 400 of FIG. 4, i.e.: out[4], out[5], out[6] and out[7]; out[8], out[9], out[10] and out[11]; out[12], out[13], out[14] and out[15]; and out[16], out[17], out[18] and out[19].

By way of a hardware overhead comparison, if the tree hardware unit is equipped with a depth 2D (e.g., 6 in the above example), which happens occasionally, there are a total $2^6-1=63$ nodes, where only 13 nodes are used practically while having 50 filler nodes. This results in 20% utilization. On the other hand, illustrative embodiments require having only 21 nodes with only 8 filler nodes, which results in 62% utilization. Advantageously, 3× reduced hardware with 42% utilization increase is realized in accordance with illustrative embodiments.

Figure 6:
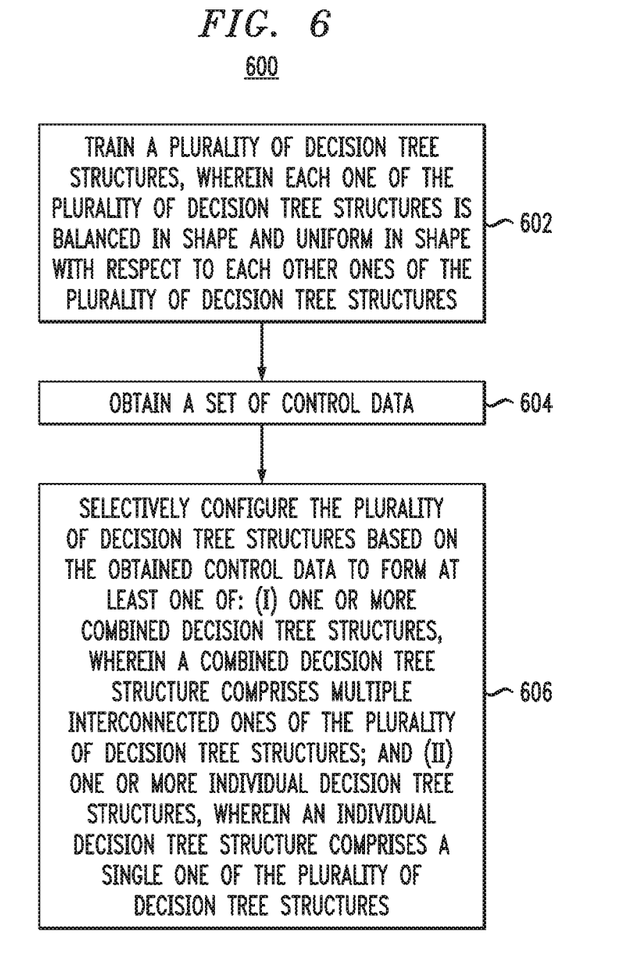
FIG. 6 depicts a methodology for decision tree interconnection in a random forest algorithm system according to an illustrative embodiment.

FIG. 6 depicts a random forest methodology 600 according to an illustrative embodiment. It is to be appreciated that methodology 600 can be performed, for example, by a system that includes system 400 of FIG. 4. However, in alternative embodiments, methodology 600 can be performed by other systems configured to perform the steps of the methodology.

As shown, step 602 trains a plurality of decision tree structures, wherein each one of the plurality of decision tree structures is balanced in shape and uniform in shape with respect to each other ones of the plurality of decision tree structures. Step 604 obtains a set of control data. Step 606 selectively configures the plurality of decision tree structures based on the obtained control data to form at least one of: (i) one or more combined decision tree structures, wherein a combined decision tree structure comprises multiple interconnected ones of the plurality of decision tree structures; and (ii) one or more individual decision tree structures, wherein an individual decision tree structure comprises a single one of the plurality of decision tree structures.

Figure 7:
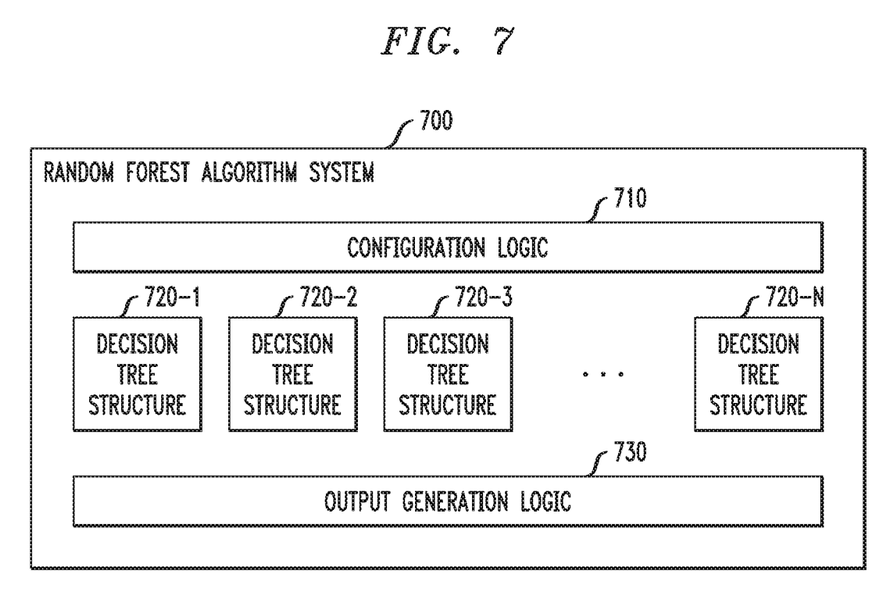
FIG. 7 depicts an exemplary implementation of a random forest algorithm system according to an illustrative embodiment.

FIG. 7 depicts an exemplary implementation of a random forest algorithm system 700 according to an illustrative embodiment. As shown, system 700 comprises configuration logic 710, a plurality of decision tree structures 720-1, 720-2, 720-3, . . . , 720-N, and output generation logic 730. It is to be appreciated that with respect to the exemplary hardware implementations depicted in FIGS. 4 and 5 and described above, reconfiguration register 402 and the plurality of multiplexers 404-1, 404-02, 404-3, and 404-4 can be implemented as part of configuration logic 710. Further, the plurality of decision tree unit hardware modules 406-1, 406-02, 406-3, 406-4, and 406-5 (and, thus, the decision tree unit hardware module 500 example of FIG. 5) can be respectively implemented by the plurality of decision tree structures 720-1, 720-2, 720-3, . . . , 720-N (e.g., each decision tree structure 720 represents one of the decision tree unit hardware modules 406-1, 406-02, 406-3, 406-4, and 406-5). Still further, the majority voter module 408 can be implemented as part of output generation logic 730.

In one exemplary embodiment, configuration logic 710, a plurality of decision tree structures 720-1, 720-2, 720-3, . . . , 720-N, and output generation logic 730 of random forest algorithm system 700 are implemented by one or more application-specific integrated circuits (ASICs). ASICs are integrated circuit (IC) chips or devices customized for a particular purpose that comprise logic (e.g., circuitry, processors, memory, etc.) that are programmed with executable program code (e.g., instruction code, computer program code, etc.) or otherwise configured for the particular purpose. In this exemplary case, the particular purpose is the implementation and execution of a random forest algorithm system and, more specifically, the inference portion of a random forest algorithm system as compared with the training portion of a random forest algorithm system; although, configuration logic 710 of system 700 can also comprise training logic to generate the decision tree structures 720. An ASIC is also considered a system-on-chip (SoC). Some ASIC implementations that can be used with one or more illustrative embodiments employ cell libraries of user selectable basic logic functions (e.g., a multiplexer, a comparator, etc. that are comprised of multiple VLSI transistor devices to provide various functions such as switching, comparing, etc.) to enable configuration (and reconfiguration) of the system.

It is to be further appreciated that random forest algorithm system 700 comprising configuration logic 710, a plurality of decision tree structures 720-1, 720-2, 720-3, . . . , 720-N, and output generation logic 730 can be realized in alternative circuitry/processor-based technology such as technology including one or more multi-core central processing units (CPUs), one or more graphics processing units (GPUs), and one or more field programmable gate arrays (FPGAs). In some embodiments, random forest algorithm system 700 can be implemented as a combination of two or more circuitry/processor-based technologies (e.g., ASIC, CPU, GPU, FPGA, etc.).

The techniques depicted in FIGS. 1-7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-7 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
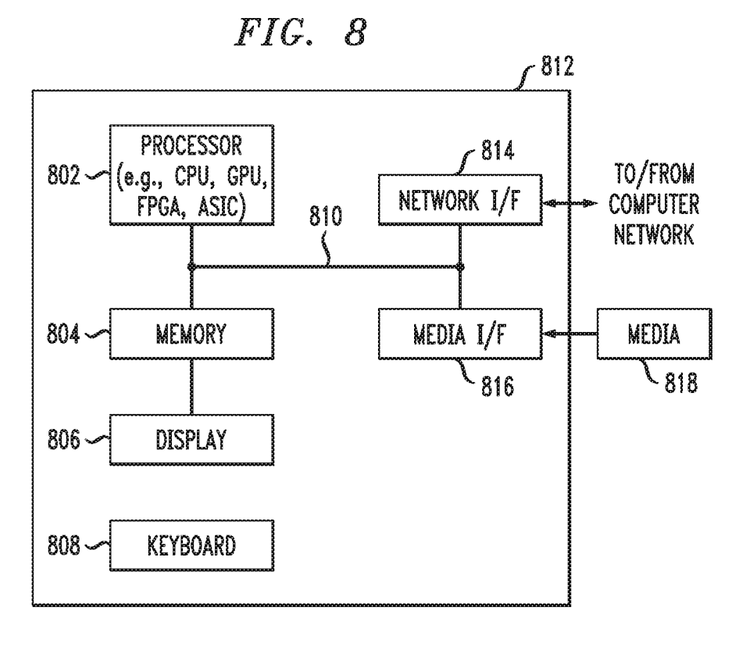
FIG. 8 depicts an exemplary processor system according to an illustrative embodiment.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
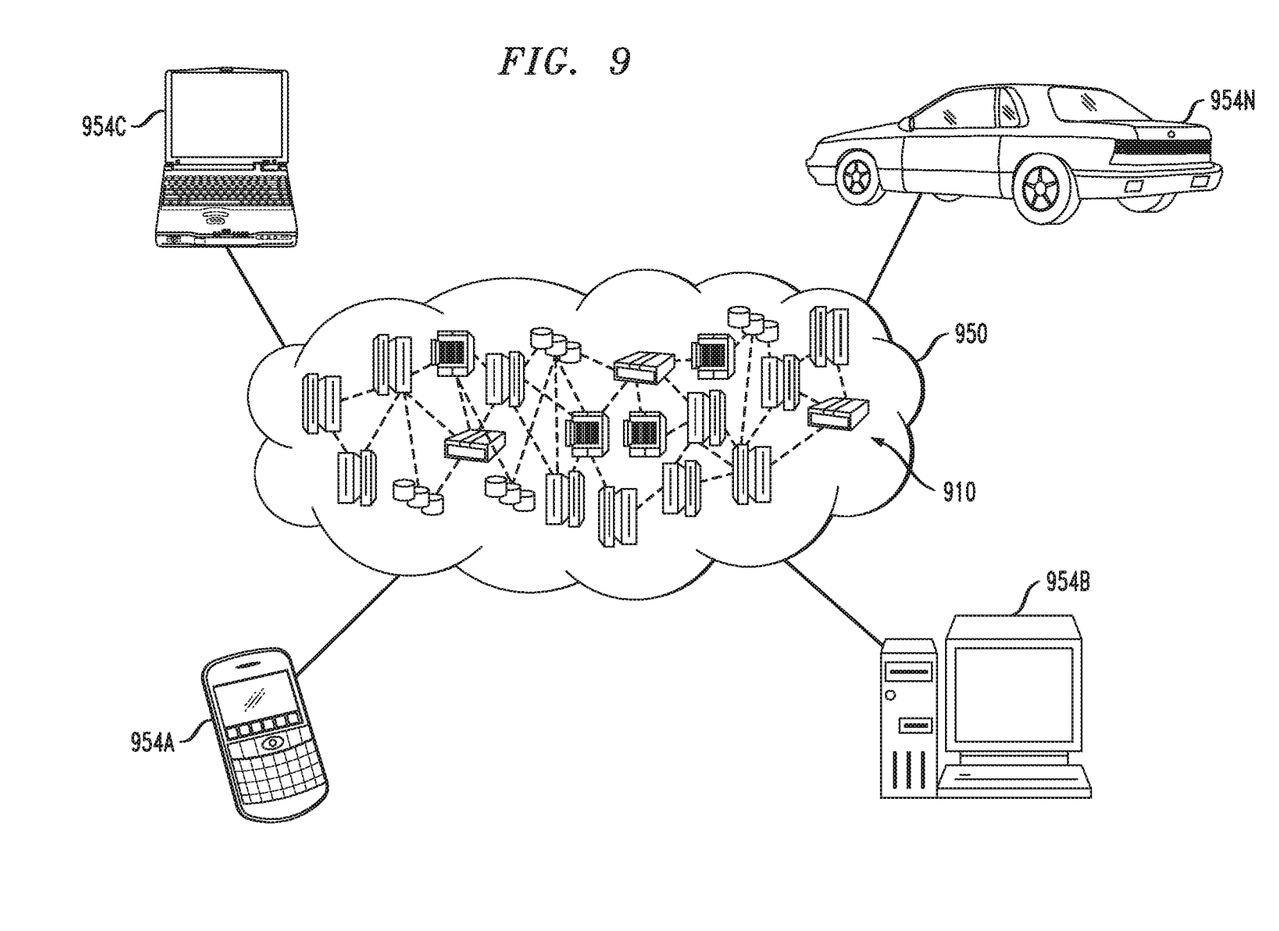
FIG. 9 depicts a cloud computing environment according to an illustrative embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
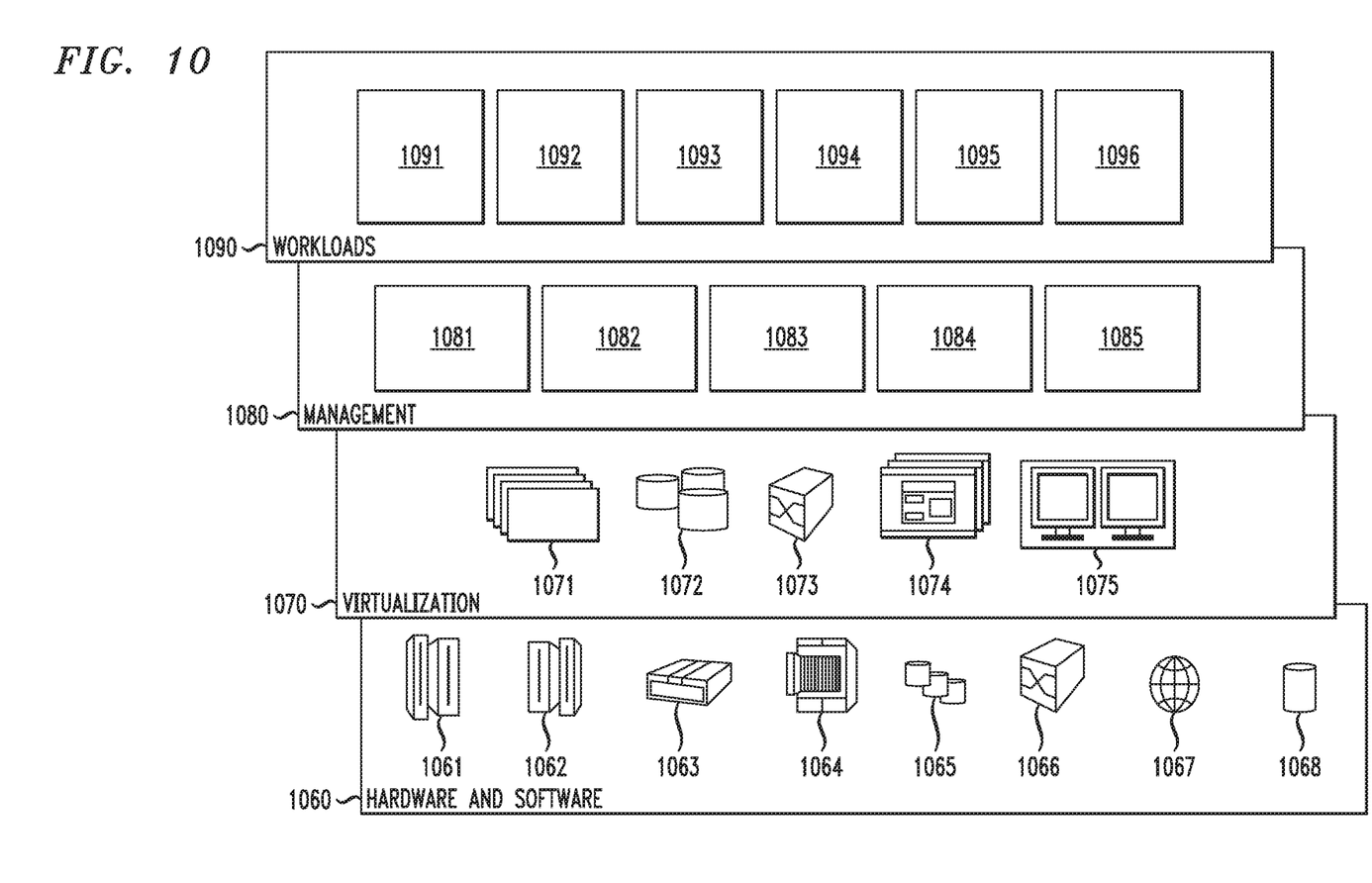
FIG. 10 depicts abstraction model layers according to an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075. In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and random forest algorithm processing 1096, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) that replaces the complex manual (e.g., custom-built) development of model restoration logic. As illustratively described herein, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a plurality of decision tree unit hardware modules;
   a register;
   a plurality of multiplexers, wherein each multiplexer is coupled to the register, and coupled to a respective decision tree unit hardware module of the plurality of decision tree unit hardware modules; and
   a majority voter module coupled to the register and to the plurality of decision tree unit hardware modules;
   wherein each decision tree unit hardware module comprises a plurality of decision tree structure, wherein each decision tree structure of the plurality of decision tree unit hardware modules comprises a balanced decision tree structure having a same number of nodes and a same depth, and hard-wired interconnects;
   wherein the register is configured to output control data to the plurality of multiplexers to cause the plurality of multiplexers to selectively configure each of one or more of the decision tree unit hardware modules to function as an independent decision tree structure or to selectively configure at least two of the decision tree unit hardware modules to form a decision tree structure which comprises a combination of at least a first decision tree structure and a second decision tree structure of the plurality of decision tree unit hardware modules by selectively connecting at least one leaf node of the first decision tree structure to an internal node of the second decision tree structure; and
   wherein the majority voter module is configured to receive output data from the decision tree unit hardware modules, and the control data from the register which indicates the configuration of the decision tree unit hardware modules, and generate a decision based on the received output data and the control data.

2. The system of claim 1, wherein each of the decision tree structures of the plurality of decision tree unit hardware modules has a same depth of three or more.

3. The system of claim 2, wherein at least one decision tree structure of the plurality of decision tree unit hardware modules comprises at least one filler node to make the at least one decision tree structure uniform in shape with respect to each other ones of the decision tree structures.

4. The system of claim 1, wherein:
   each multiplexer of the plurality of multiplexers comprises:
      a selection input port coupled to the register;
      a first input port, and second input port; and
      an output port that is coupled to an input port of a respective decision tree unit hardware module of the plurality of decision tree unit hardware modules;
   the control data output from the register comprises a plurality of control bits;
   each control bit is applied to the selection input port of a respective multiplexer of the plurality of multiplexers;
   in response to a control bit having a first logic level applied to the selection input port of a given multiplexer, the given multiplexer selects a first data input applied to the first input port thereof; and
   in response to the control bit having a second logic level applied to the selection input port of the given multiplexer, the given multiplexer selects a second data input applied to the second input port thereof.

5. The system of claim 4, wherein:
   the first decision tree structure comprises a plurality of output ports, wherein each output port of the first decision tree structure is coupled to the majority voter module, and to a respective second input port of a respective multiplexer of the plurality of multiplexers; and
   the logic levels of the control bits applied to respective selection input ports of the multiplexers are set to cause each given decision tree unit hardware module, which is coupled to an output port of a given multiplexer, to function (i) independently of other decision tree unit hardware modules, or (ii) as a sub-tree that is coupled to a given output port of the first decision tree structure by the given multiplexer.

6. The system of claim 4, wherein the logic levels of the control bits are prestored in the register or dynamically set in the register to perform a classification process.

7. The system of claim 1, wherein each one of the plurality of decision tree unit hardware modules comprises a plurality of nodes, wherein at least one node compares an input value to a threshold value and generates a result based on the comparison.

8. The system of claim 7, wherein at least one node outputs a classification label.

9. The system of claim 1, wherein the plurality of decision tree unit hardware modules is part of a random forest algorithm implementation.

10. The system of claim 1, wherein the system is implemented as part of one or more integrated circuits.

11. An apparatus comprising:
    at least one processor;
    at least one memory including instruction code; and
    control logic, wherein the control logic comprises:
       a plurality of decision tree unit hardware modules;
       a register;
       a plurality of multiplexers, wherein each multiplexer is coupled to the register, and coupled to a respective decision tree unit hardware module of the plurality of decision tree unit hardware modules; and
       a majority voter module coupled to the register and to the plurality of decision tree unit hardware modules;

wherein each decision tree unit hardware module comprises a decision tree structure, wherein each decision tree structure of the plurality of decision tree unit hardware modules comprises a balanced decision tree structure having a same number of nodes and a same depth, and hard-wired interconnects;

wherein the at least one memory and the instruction code are configured to, with the at least one processor, to instruct the control logic to:

cause the register to output control data to the plurality of multiplexers to cause the plurality of multiplexers to selectively configure each of one or more of the decision tree unit hardware modules to function as an independent decision tree structure or to selectively configure at least two of the decision tree unit hardware modules to form a decision tree structure which comprises a combination of at least a first decision tree structure and a second decision tree structure of the plurality of decision tree unit hardware modules by selectively connecting at least one leaf node of the first decision tree structure to an internal node of the second decision tree structure; and cause the majority voter module to receive output data from the decision tree unit hardware modules, and the control data from the register which indicates the configuration of the decision tree unit hardware modules, and generate a decision based on the received output data and the control data.

12. The apparatus of claim 11, wherein each of the decision tree structures of the plurality of decision tree unit hardware modules has a same depth of three or more.

13. The apparatus of claim 11, wherein:
each multiplexer of the plurality of multiplexers comprises:
    a selection input port coupled to the register;
    a first input port, and second input port; and
    an output port that is coupled to an input port of a respective decision tree unit hardware module of the plurality of decision tree unit hardware modules;
the control data output from the register comprises a plurality of control bits;
each control bit is applied to the selection input port of a respective multiplexer of the plurality of multiplexers;
in response to a control bit having a first logic level applied to the selection input port of a given multiplexer, the given multiplexer selects a first data input applied to the first input port thereof; and
in response to the control bit having a second logic level applied to the selection input port of the given multiplexer, the given multiplexer selects a second data input applied to the second input port thereof.

14. The apparatus of claim 13, wherein:
the first decision tree structure comprises a plurality of output ports, wherein each output port of the first decision tree structure is coupled to the majority voter module, and to a respective second input port of a respective multiplexer of the plurality of multiplexers; and
the at least one memory and the instruction code being further configured to, with the at least one processor, to set the logic levels of the control bits to be applied to respective selection input ports of the multiplexers to cause each given decision tree unit hardware module, which is coupled to an output port of a given multiplexer, to function (i) independently of other decision tree unit hardware modules, or (ii) as a sub-tree that is coupled to a given output port of the first decision tree structure by the given multiplexer.

15. The apparatus of claim 11, wherein the plurality of decision tree unit hardware modules is part of a random forest algorithm implementation.

16. A method, comprising:
training a plurality of decision tree structures each implemented by one of a plurality of decision tree unit hardware modules, wherein each one of the plurality of decision tree structures comprises hard-wired interconnects and is balanced in shape and uniform in shape and has a same number of nodes and a same depth with respect to each other ones of the plurality of decision tree structures;

setting control data in a register which is coupled to a plurality of multiplexers, each multiplexer being coupled to a respective decision tree unit hardware module of the plurality of decision tree unit hardware modules;

applying the control data to the plurality of multiplexers to cause the plurality of multiplexers to selectively configure each of one or more of the decision tree unit hardware modules to function as an independent decision tree structure or to selectively configure at least two of the decision tree unit hardware modules to form a decision tree structure which comprises a combination of at least a first decision tree structure and a second decision tree structure by selectively connecting at least one leaf node of the first decision tree structure to an internal node of the second decision tree structure; and receiving, by a majority voter module, output data from the decision tree unit hardware modules, and the control data from the register which indicates the configuration of the decision tree unit hardware modules, to generate a decision based on the received output data and the control data;

wherein one or more of the steps are executed by processing circuitry configured to execute instruction code.

17. The method of claim 16, wherein:
each multiplexer of the plurality of multiplexers comprises:
    a selection input port coupled to the register;
    a first input port, and second input port; and
    an output port that is coupled to an input port of a respective decision tree unit hardware module of the plurality of decision tree unit hardware modules;
the control data output from the register comprises a plurality of control bits;
each control bit is applied to the selection input port of a respective multiplexer of the plurality of multiplexers;
in response to a control bit having a first logic level applied to the selection input port of a given multiplexer, the given multiplexer selects a first data input applied to the first input port thereof; and
in response to the control bit having a second logic level applied to the selection input port of the given multiplexer, the given multiplexer selects a second data input applied to the second input port thereof.

18. The method of claim 17, wherein:
the first decision tree structure comprises a plurality of output ports, wherein each output port of the first decision tree structure is coupled to the majority voter module, and to a respective second input port of a respective multiplexer of the plurality of multiplexers; and applying the control data to a plurality of multiplexers comprises setting the logic levels of the control bits to be applied to respective selection input ports of the multiplexers to cause each given decision tree unit hardware module, which is coupled to an output port of a given multiplexer, to function (i) independently of other decision tree unit hardware modules, or (ii) as a sub-tree that is coupled to a given output port of the first decision tree structure by the given multiplexer.

19. The method of claim 16, wherein the plurality of decision tree structures is part of a random forest algorithm implementation.

20. An article of manufacture comprising a non-transitory computer-readable storage medium having embodied therein executable instruction code that when executed by a processor causes the processor to perform steps of:
training a plurality of decision tree structures each implemented by one of a plurality of decision tree unit hardware modules, wherein each one of the plurality of decision tree structures comprises hard-wired interconnects and is balanced in shape and uniform in shape and has a same number of nodes and a same depth with respect to each other ones of the plurality of decision tree structures;
setting control data in a register which is coupled to a plurality of multiplexers, each multiplexer being coupled to a respective decision tree unit hardware module of the plurality of decision tree unit hardware modules;
applying the control data to the plurality of multiplexers to cause the plurality of multiplexers to selectively configure each of one or more of the decision tree unit hardware modules to function as an independent decision tree structure or to selectively configure at least two of the decision tree unit hardware modules to form a decision tree structure which comprises a combination of at least a first decision tree structure and a second decision tree structure by selectively connecting at least one leaf node of the first decision tree structure to an internal node of the second decision tree structure; and
receiving, by a majority voter module, output data from the decision tree unit hardware modules, and the control data from the register which indicates the configuration of the decision tree unit hardware modules, to generate a decision based on the received output data and the control data.

21. The article of manufacture of claim 20, wherein:
each multiplexer of the plurality of multiplexers comprises:
a selection input port coupled to the register;
a first input port, and second input port; and
an output port that is coupled to an input port of a respective decision tree unit hardware module of the plurality of decision tree unit hardware modules;
the control data output from the register comprises a plurality of control bits;
each control bit is applied to the selection input port of a respective multiplexer of the plurality of multiplexers;
in response to a control bit having a first logic level applied to the selection input port of a given multiplexer, the given multiplexer selects a first data input applied to the first input port thereof; and
in response to the control bit having a second logic level applied to the selection input port of the given multiplexer, the given multiplexer selects a second data input applied to the second input port thereof.

22. The article of manufacture of claim 21, wherein:
the first decision tree structure comprises a plurality of output ports, wherein each output port of the first decision tree structure is coupled to the majority voter module, and to a respective second input port of a respective multiplexer of the plurality of multiplexers; and
applying the control data to a plurality of multiplexers comprises setting the logic levels of the control bits to be applied to respective selection input ports of the multiplexers to cause each given decision tree unit hardware module, which is coupled to an output port of a given multiplexer, to function (i) independently of other decision tree unit hardware modules, or (ii) as a sub-tree that is coupled to a given output port of the first decision tree structure by the given multiplexer.

23. A system comprising:
a plurality of decision tree structures, wherein each one of the plurality of decision tree structures comprises a balanced decision tree structure with hard-wired interconnects and is balanced in shape and uniform in shape and has a same number of nodes and a same depth with respect to each other ones of the plurality of decision tree structures;
configuration logic operatively coupled to the plurality of decision tree structures, wherein the configuration logic comprises a register, and a plurality of multiplexers, wherein each multiplexer is coupled to the register, and coupled to a respective decision tree structure of the plurality of decision tree structures; and
output generation logic coupled to the register and to the plurality of decision tree structures;
wherein the register is configured to output control data to the plurality of multiplexers to cause the plurality of multiplexers to selectively configure each of one or more of the decision tree structures to function as an independent decision tree structure or to selectively configure at least two of the decision tree structures to form a decision tree structure which comprises a combination of at least a first decision tree structure and a second decision tree structure of the plurality of decision tree structures by selectively connecting at least one leaf node of the first decision tree structure to an internal node of the second decision tree structure; and
wherein the output generation logic is configured to receive output data from the decision tree structures, and the control data from the register which indicates the configuration of the decision tree structures, and generate a decision based on the received output data and the control data.

24. The system of claim 23, wherein the system is configured to implement a random forest algorithm.

25. The system of claim 23, wherein the system is implemented as part of one or more integrated circuits.

* * * * *